United States Patent
Fan et al.

(10) Patent No.: US 11,966,060 B1
(45) Date of Patent: Apr. 23, 2024

(54) OPTICAL WAVEGUIDE DEVICE FOR DISPLAY AND DISPLAY DEVICE HAVING THE SAME

(71) Applicant: JIAXING UPHOTON OPTOELECTRONICS TECHNOLOGY CO., LTD., Tongxiang (CN)

(72) Inventors: Zhentao Fan, Tongxiang (CN); Lei Sui, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/407,784

(22) Filed: Jan. 9, 2024

(30) Foreign Application Priority Data

Apr. 19, 2023 (CN) .......................... 202310423175.2

(51) Int. Cl.
*G02B 27/42* (2006.01)
*G02B 6/34* (2006.01)
*G02B 27/01* (2006.01)

(52) U.S. Cl.
CPC ........... *G02B 27/0172* (2013.01); *G02B 6/34* (2013.01); *G02B 27/4205* (2013.01); *G02B 2027/0118* (2013.01)

(58) Field of Classification Search
CPC .............................. G02B 27/42; G02B 27/4205
See application file for complete search history.

(56) References Cited

U.S. PATENT DOCUMENTS

| 2018/0113313 | A1* | 4/2018 | Tekolste ............ G02B 27/4205 |
| 2020/0110261 | A1 | 4/2020 | Grey et al. |
| 2021/0116645 | A1 | 4/2021 | Kojima et al. |
| 2022/0057552 | A1 | 2/2022 | Shramkova et al. |
| 2022/0099990 | A1* | 3/2022 | Olkkonen ............ G02B 5/1866 |
| 2023/0050198 | A1* | 2/2023 | McGrew ............ G02B 27/4205 |
| 2023/0213758 | A1* | 7/2023 | Stensvad ............ G02B 27/0103 |
| | | | 359/13 |

FOREIGN PATENT DOCUMENTS

| CN | 113791470 A | 12/2021 |
| CN | 216210025 U | 4/2022 |
| CN | 114740572 A | 7/2022 |
| CN | 218675519 U | 3/2023 |
| WO | 2004074888 A1 | 9/2004 |
| WO | 2022247487 A1 | 12/2022 |

\* cited by examiner

*Primary Examiner* — Eric Wong
(74) *Attorney, Agent, or Firm* — HAUPTMAN HAM, LLP (57) ABSTRACT

An optical waveguide device is disclosed, in which an input section comprises a first waveguide substrate and a first relief grating formed on a surface thereof, and refractive indices n1, n2 of the first relief grating and the first waveguide substrate satisfy n2<n1, such that a first maximum average number of reflections that a light beam within a predetermined FOV range is subjected to on the surface after diffraction of the predetermined order before leaving a region where the first relief grating lies, is N, and N≤2, wherein when N≤1, N≤M−0.25; when 1<N≤1.5, N≤M−0.5; and when 1.5<N≤2, N≤M−0.75, wherein M is a second maximum average number of reflections assuming the first waveguide substrate has the same refractive index as the first relief grating.

20 Claims, 7 Drawing Sheets

OPTICAL WAVEGUIDE DEVICE FOR DISPLAY AND DISPLAY DEVICE HAVING THE SAME

TECHNICAL FIELD

The present disclosure relates to diffraction-based display technology, and in particular, to an optical waveguide device for image display and a display device having the optical waveguide device.

BACKGROUND

With the development of science and technology, AR (Augmented Reality) display technology, as a very intelligent and portable display technology, is slowly coming to the public. Its main feature is to superimpose a virtual picture on a real scene so that people can watch the real scene while watching the virtual picture.

Technological solutions having diffraction gratings combined with optical waveguide have been widely used for augmented reality displays, wherein the diffraction gratings are used as input element and output element, and in some cases further comprise a turning grating. The input grating couples incident light carrying image information into the waveguide substrate. The output grating makes the light carrying image information to propagate and expand, and at the same time couples the light out of the waveguide substrate to form a coupled-out light field. An eye receives light from the coupled-out light field so that, for example, an image carried by the incident light can be observed.

Optical waveguide devices incorporating diffraction gratings still have shortcomings in brightness and uniformity when used for image display. With display devices and optical waveguide devices become thinner and lighter, these problems become more pronounced and need to be solved.

SUMMARY

The object of the present disclosure is to provide an optical waveguide device for display and a display device having the optical waveguide device, so as to at least partly overcome the deficiencies in the prior technology.

According to one aspect of the present disclosure, an optical waveguide device for display is provided, which comprises an input section and an output section, in which the input section comprises a first waveguide substrate and a first relief grating formed on a surface of the first waveguide substrate, and the first relief grating has a first grating vector and is used to couple light irradiated on the first relief grating at an incident angle within a predetermined FOV range, into the first waveguide substrate through diffraction of a predetermined order, in such a way that the light propagates in the first waveguide substrate through total reflection in substantially the direction of the first grating vector, so as to be coupled out of the waveguide device for display by the output section, wherein:

the first relief grating has a first refractive index n1, the first waveguide substrate has a second refractive index n2, and n2<n1, such that a first maximum average number of reflections that a light beam of any incident angle within the predetermined FOV range is subjected to on the surface of the first waveguide substrate after the diffraction of the predetermined order before leaving a region where the first relief grating lies, is N, and N≤2, wherein: when N≤1, N≤M−0.25; when 1<N≤1.5, N≤M−0.5; and when 1.5<N≤2, N≤M−0.75, wherein M is a second maximum average number of reflections that the light beam is subjected to on the surface of the first waveguide substrate after the diffraction of the predetermined order before leaving the region where the first relief grating lies, assuming that the refractive index of the first waveguide substrate is equal to the first refractive index n1.

Advantageously, the first and the second maximum average number N of reflections and M are calculated with the following formulae, respectively:

$$N = \max\left(\frac{L}{4h\tan\left(\arcsin\left(\frac{\sin(\theta_0) + \frac{k\lambda}{d}}{n_2}\right)\right)} - 0.5\right)$$

$$M = \max\left(\frac{L}{4h\tan\left(\arcsin\left(\frac{\sin(\theta_0) + \frac{k\lambda}{d}}{n_1}\right)\right)} - 0.5\right)$$

wherein L is a length of the first relief grating in the direction of the first grating vector, h is a thickness of the first waveguide substrate, $\theta_0$ is an incident angle of light relative to the first relief grating, k is the predetermined order, $\lambda$ is a wavelength of light, and d is a grating period corresponding to the first grating vector.

Advantageously, the maximum average number N of reflections≤1.5.

Advantageously, the predetermined order is positive first order.

Advantageously, the thickness of the first waveguide substrate h≤0.75 mm; preferably, h≤0.65 mm; more preferably, h≤0.5 mm.

In some advantageous embodiments, the optical waveguide device for display further comprises a turning section provided with a turning grating for relaying light from the input section to the output section through diffraction.

Advantageously, the input section further comprises a composite synergistic layer disposed between the first relief grating and the first waveguide substrate, the composite synergistic layer comprises at least two subregions, the at least two subregions comprise a first subregion disposed upstream and a second subregion disposed downstream in the direction of the first grating vector, and the first subregion and the second subregion have the same thickness and have a fifth refractive index n5 and a sixth refractive index n6, respectively, such that diffracted light of the predetermined order is subjected to constructive thin-film interference in the first subregion as it passes through the composite synergistic layer, and reflected light of zero order is subjected to constructive thin-film interference in the second subregion as the diffracted light of the predetermined order is reflected on said surface of the first waveguide substrate.

Advantageously, the composite synergistic layer further comprises at least one transition subregion, which has the same thickness as and a refractive index different from those of the first subregion and second subregion.

Advantageously, at least one transition subregion lies between the first region and second region in the direction of the first grating vector.

Advantageously, a spacing of boundaries between the at least two subregions of the composite synergistic layer in the direction of the first grating vector substantially equals to a spacing in the direction of the first grating vector between reflection positions of two sequential reflections on the surface of the first waveguide substrate after light of a certain incident angle is coupled into the first waveguide substrate.

Advantageously, at least a boundary between two of the subregions is straight, arcuate, or polyline-shaped.

In some advantageous embodiments, the output section comprises a second waveguide substrate and a second relief grating formed on the second waveguide substrate, the second waveguide substrate has a third refractive index n3, and the second relief grating has a fourth refractive index n4, wherein n2<n3, and n2<n4.

Advantageously, n3-n2>0.1.

Advantageously, an antireflection coating is formed on a border between the first waveguide substrate and the second waveguide substrate for enhancing transmittance of light from the first waveguide substrate to the second waveguide substrate.

In some advantageous embodiments, the output section comprises a second waveguide substrate and a second relief grating formed on the second waveguide substrate, and the first waveguide substrate is integral with the second waveguide substrate, such that the second waveguide substrate has the second refractive index n2.

According to another aspect of the present disclosure, a display device is provided, which comprises an optical waveguide device for display as described above.

Advantageously, the display device is a near-eye display device and comprises a lens and a frame for holding the lens close to the eye, the lens comprising the optical waveguide device for display.

Advantageously, the display device is an augmented reality display device or a virtual reality display device.

In the optical waveguide device for display according to embodiments of the present disclosure, refractive indices of the first relief grating as an input element and the corresponding first waveguide substrate are configured to reduce the number of reflections, which the light coupled into the waveguide substrate is subjected to in the region where the first relief grating lies, thereby reducing reflection loss and improving coupling-in comprehensive efficiency of the optical waveguide device. The display device according to embodiments of the present disclosure has corresponding technical advantages.

BRIEF DESCRIPTION OF THE DRAWINGS

Other features, objects and advantages of the present disclosure will become more apparent by reading detailed description of non-limiting embodiments with reference to following figures.

DETAILED DESCRIPTION

The invention is described in further detail below in connection with the accompanying drawings and embodiments. It is to be understood that other embodiments may be utilized without departing from the scope of the invention. The following detailed description is, therefore, not to be taken in a limiting sense. For ease of description, only portions relevant to the invention are shown in the accompanying drawings. It is to be noted that the embodiments and the features in the embodiments in the present disclosure may be combined with each other without conflict.

In order to improve utilization of optical energy in an optical waveguide device for display, different methods have been proposed to increase diffraction efficiency of a predetermined diffraction order expected to be used in a grating used as an input element (hereinafter also referred to as an "input grating"), so as to increase the overall optical energy that is initially coupled into the waveguide substrate. It is clear that this increasement in optical energy is highly beneficial for improving brightness and uniformity of the entire optical waveguide device for display. However, this technical approach is not a perfect solution to the problem.

The present disclosure is made based on the following further discovery: one part of energy loss of the optical energy coupled into the waveguide substrate of the optical waveguide device by diffraction of a predetermined order lies in the reflection loss of the light at the interface between the grating and the waveguide substrate, i.e., what is required is reflection of zero order, but due to grating diffraction, there exist diffraction of a number of orders other than the reflection of zero order, which results in the energy loss; and such energy loss not only relates to the optical properties of the two sides of the interface (especially the refractive index), but also is significantly affected by the number of reflections at the interface. For example, one can obtain a high diffraction efficiency for a predetermined order (usually a positive first diffraction order) by designing a blazed grating, a slant grating, etc. which are used as an input element; however, the light coupled into the waveguide by the positive first diffraction order will hit the input grating again during total reflection propagation, part of the light will be reflected in the direction of total reflection, and part of the light will be output and loss will occur (see the light shown by dashed arrows in FIG. 3 and FIG. 12); this ultimately leads to the fact that although these gratings have a high diffraction efficiency of positive first order, the loss due to reflection is also often high, and the amount of energy that can really propagate to the output grating through total reflection is not high.

In addition, the present disclosure is also based on the consideration that, with the current display device in which an optical waveguide device is used continues to become thinner and lighter, the optical waveguide device for display is also bound to develop in the direction of thinness and lightness, and it is desired, for example, that the thickness of the waveguide substrate in the optical waveguide device is to be greatly thinned. The thinned waveguide substrate will significantly increase the number of reflections of light coupled into the waveguide substrate in the region where the grating as the input element lies, thereby greatly increasing the corresponding optical energy loss.

Based on the above findings and considerations, the present disclosure proposes a new technical approach, in which the number of reflections that light coupled into the waveguide substrate is subjected to in the region where the grating lies by configuring the refractive indices of the grating used as an input element and the corresponding waveguide substrate, to reduce the reflective losses and to improve the coupling-in comprehensive efficiency of the optical waveguide device.

The optical waveguide device for display according to embodiments of the present disclosure will be described in more detail hereinafter in connection with the accompanying drawings.

Figure 1:
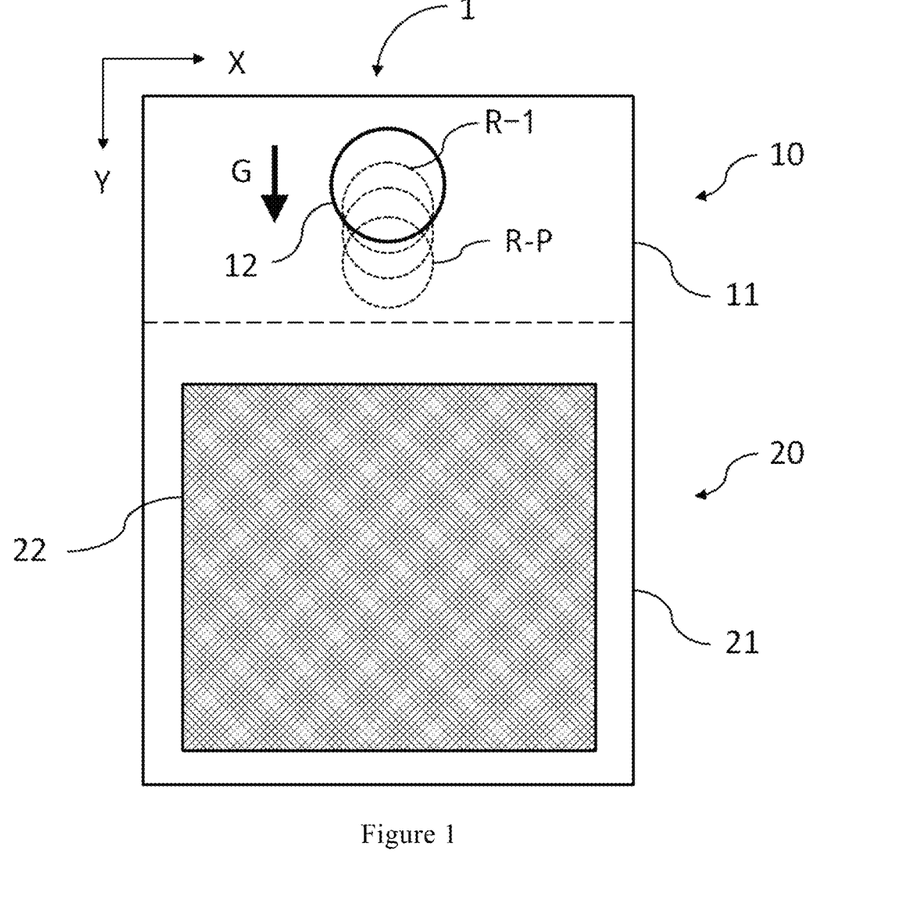
FIG. 1 is a plan view of an optical waveguide device for display according to embodiments of the present disclosure.

FIG. 1 shows a plan view of an optical waveguide device for display according to embodiments of the present disclosure. As shown in FIG. 1, the optical waveguide device 1 for display comprises an input section 10 and an output section 20, in which the input section 10 comprises a first waveguide substrate 11 and a first relief grating 12 formed on a surface 11$a$ (see FIG. 2) of the first waveguide substrate 11, and the first relief grating 12 has a first grating vector G as shown by the bolded arrow in FIG. 1. The first relief grating 12 is used to couple light irradiated on the first relief grating 12 at an incident angle within a predetermined FOV range, into the first waveguide substrate through diffraction of a predetermined order (usually positive first order), in such a way that the light propagates in the first waveguide substrate 11 through total reflection in substantially the direction of the first grating vector, so as to be coupled out of the waveguide device 1 for display through the output section 20, thereby achieving display.

As shown in FIG. 1, the output section 20 can comprise a second waveguide substrate 21 and a second relief grating 22 formed on the second waveguide substrate 21. The output portion 20 is used to receive light from the input section 10 and couple the light out of the optical waveguide device 1 via the second relief grating 22.

Although in FIG. 1 and some other examples shown in the accompanying drawings, the optical waveguide device 1 for display comprises only the input section 10 and the output section 20, the present disclosure is not limited thereto. In other examples, the optical waveguide device 1 for display can also comprise other functional portions, such as a turning section provided with a turning grating. Here, the term "turning grating" refers to a grating being used to relay light from the input section 10 to the output section 20 through diffraction.

In FIG. 1, a reflection spot contour of diffracted light of a predetermined order that is coupled into the first waveguide substrate 11 on the surface 11$a$ is indicated by a dashed circle, where the reflection spot contour of the first reflection is marked with the symbol "R-1", and the reflection spot contour of the last (maximum number of reflections P) reflection before light leaves the region where the first relief grating 12 lies, is marked with the symbol "R-P".

Figure 2:
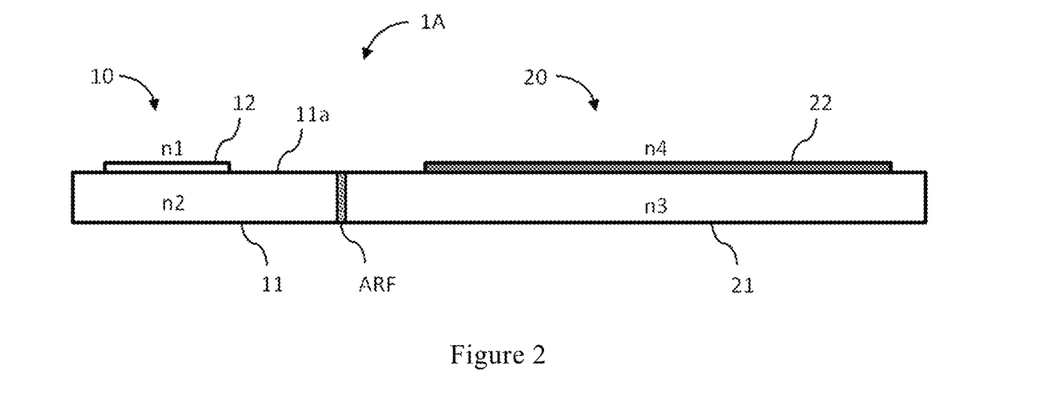
FIG. 2 is a cross-sectional schematic view of an optical waveguide device for display according to the first embodiment of the present disclosure.

FIG. 2 is a cross-sectional schematic view of an optical waveguide device 1A for display according to the first embodiment of the present disclosure. Referring to FIG. 2, it can be seen that the first relief grating 12 has a first refractive index n1, and the first waveguide substrate 11 has a second refractive index n2. According to embodiments of the present disclosure, the first refractive index n1 of the first relief grating 12 and the second refractive index n2 of the first waveguide substrate 11 are selected to be n2<n1, such that a first maximum average number of reflections that a light beam of any incident angle within the predetermined FOV range is subjected to on the surface 11$a$ of the first waveguide substrate 11 after the diffraction of the predetermined order before leaving a region where the first relief grating 12 lies, is N, and N≤2, wherein: when N≤1, N≤M−0.25; when 1<N≤1.5, N≤M−0.5; and when 1.5<N≤2, N≤M−0.75, wherein M is a second maximum average number of reflections that the light beam is subjected to on the surface 11$a$ of the first waveguide substrate 11 after the diffraction of the predetermined order before leaving the region where the first relief grating 12 lies, assuming that the refractive index of the first waveguide substrate 11 is equal to the first refractive index n1. Preferably, according to embodiments of the present disclosure, N≤1.5.

It should be understood that the "average number of reflections" in this application can be an integer or a non-integer. This is because the number of reflections on the surface 11$a$ that light irradiated on different positions of the first relief grating 12 at the same incident angle is subjected to after subjected to diffraction of the predetermined order by the first relief grating 12 and before leaving the region where the first relief grating 12 lies, varies. For example, referring to the reflection spot contour shown in FIG. 1, the part of one same dashed circle overlapping the first relief grating 12 indicates that the light is reflected within the region where the first relief grating 12 lies, and the part outside the first relief grating 12 indicates that the light is reflected outside the region where the first relief grating 12 lies, so it can be seen that the numbers of reflections that different parts of light are subjected on the surface 11$a$ before leaving the region where the first relief grating 12 lies, are different. Due to that the above difference in the numbers of reflections that light of the same incident angle is subjected has an effect on the reflection loss, the "average number of reflections" in the present disclosure can be a non-integer to more accurately represent the reflections that all of the incident light of the same incident angle is subjected in the region where the grating lies after being coupled into the substrate. From another point of view, it can be understood that for each time of reflection, the spot on the surface 11$a$ irradiated by the light beam has a certain area, and the light in a part of the area (a first area) is reflected in the region where the first relief grating 12 lies, while the light in the remaining part of the area is reflected outside of the region, so for the overall of this light, the average number of reflections in the region where the first relief grating 12 lies that bring about reflection loss can be expressed as a decimal number, and the larger the first area is as a proportion of the overall area of the light spot, the larger the value.

Figure 3:
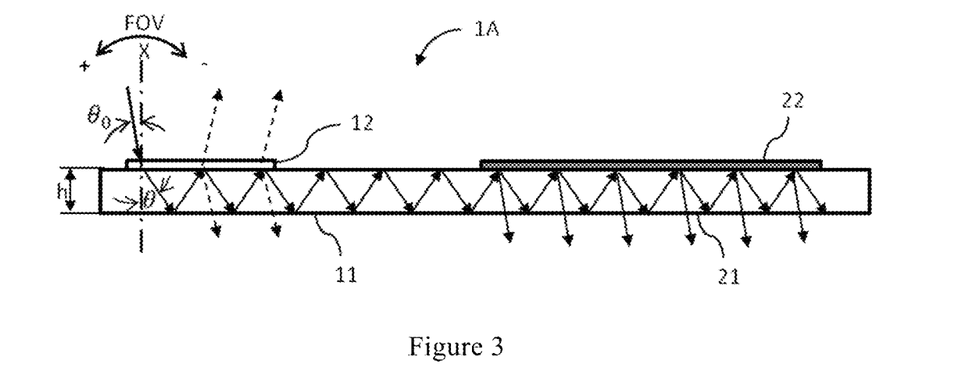
FIG. 3 schematically illustrates light propagation in an optical waveguide device for display according to the first embodiment of the present disclosure.

Furthermore, it should be understood that the "first maximum average number N of reflections" and the "second maximum average number M of reflections" in the present application are the maximum average number of reflections determined by considering all incident angles in a predetermined FOV range, respectively. For ease of understanding, FIG. 3 schematically illustrates light propagation in an optical waveguide device 1A for display according to the first embodiment of the present disclosure. Referring to FIG. 3, it will be understood that, due to the difference in the FOV/incidence angle $\theta_0$, the diffraction angles $\theta$ of diffracted lights of a predetermined order after diffracted by the first relief grating 12 are different, and accordingly, the distances the diffracted lights propagate (hereinafter referred to as the "reflection step") when the lights travel back and forth once between an upper surface and an lower surface of the first waveguide substrate 11, are also different. This leads to the situation that the average number of reflections that lights having different angles of incidence are subjected to before leaving the region where the first relief grating 12 lies may also be different. The "first maximum average number N of reflections" and the "second maximum average number M of reflections" in the present application are the maximum of the average number of reflections corresponding to all incident angles in the predetermined FOV range.

According to embodiments of the present disclosure, the first maximum average number N of reflections that diffracted light of the predetermined order is subjected to on the surface 11a before leaving the region where the first relief grating 12 lies, is used as a target parameter. On one hand, this provides a clear and operative target parameter for the structural design; and on the other hand, as it is a key aspect of an optical waveguide device 1 that needs to be improved in terms of brightness that the greater the average number of reflections is, the greater the optical energy loss and the worse the brightness of the image region corresponding to the according incident angle/FOV, the setting of the target parameter described above is conducive to optimizing and improving for this key aspect.

The angular range of the incident angle of the light input to the first relief grating 12 is also the FOV range of the light for display. In the present application, a FOV angle is expressed as (FOVX, FOVY), in which the field of view angle FOVX is an angle of the light inputted to the first relief grating 12 relative to the normal to the surface 11a in the direction revolving around the X-axis shown in FIG. 1, and the field of view angle FOVY is an angle of the light relative to the normal in the direction revolving around the Y-axis, wherein the X-Y plane is a plane where the surface 11a lies, and the Y-axis is parallel to the direction of the grating vector G of the first relief grating 12.

In the examples shown in FIGS. 1 to 3, the incident light having the minimum FOVX angle and a FOVY of zero shown in FIG. 3 corresponds to a diffraction angle $\theta$ that is the smallest, and thereby the average number of reflections corresponding thereto is the largest, and can be taken as the first maximum average number N of reflections. The situation is similar for the second maximum average number M of reflections. However, it should be understood that the above correspondence is only exemplary but not limiting.

In some advantageous embodiments, the maximum average numbers of reflections N and M are calculated with the following formulae, respectively:

$$N = \max\left(\frac{L}{4h\tan\left(\arcsin\left(\frac{\sin(\theta_0) + \frac{k\lambda}{d}}{n_2}\right)\right)} - 0.5\right)$$

$$M = \max\left(\frac{L}{4h\tan\left(\arcsin\left(\frac{\sin(\theta_0) + \frac{k\lambda}{d}}{n_1}\right)\right)} - 0.5\right)$$

wherein L is a length of the first relief grating 12 in the direction of the first grating vector G, h is a thickness of the first waveguide substrate 11, 6o is an incident angle of light relative to the first relief grating 12, k is the predetermined diffraction order used to couple the light into the first waveguide substrate 11, $\lambda$ is a wavelength of light, and d is a grating period corresponding to the first grating vector G.

The maximum average numbers of reflections N and M determined according to the above formulae reflect comprehensively the reflections on the surface 11a that lights irradiated on different positions of the first relief grating 12 are subjected to before leaving the region where the first relief grating 12 lies. Selecting and determining the refractive indices of the first relief grating 12 and the first waveguide substrate 11 based on the maximum average number N of reflections and M so determined is conducive to more accurately regulating and optimizing the coupling-in comprehensive efficiency of the optical waveguide device 1 for display.

Figure 4:
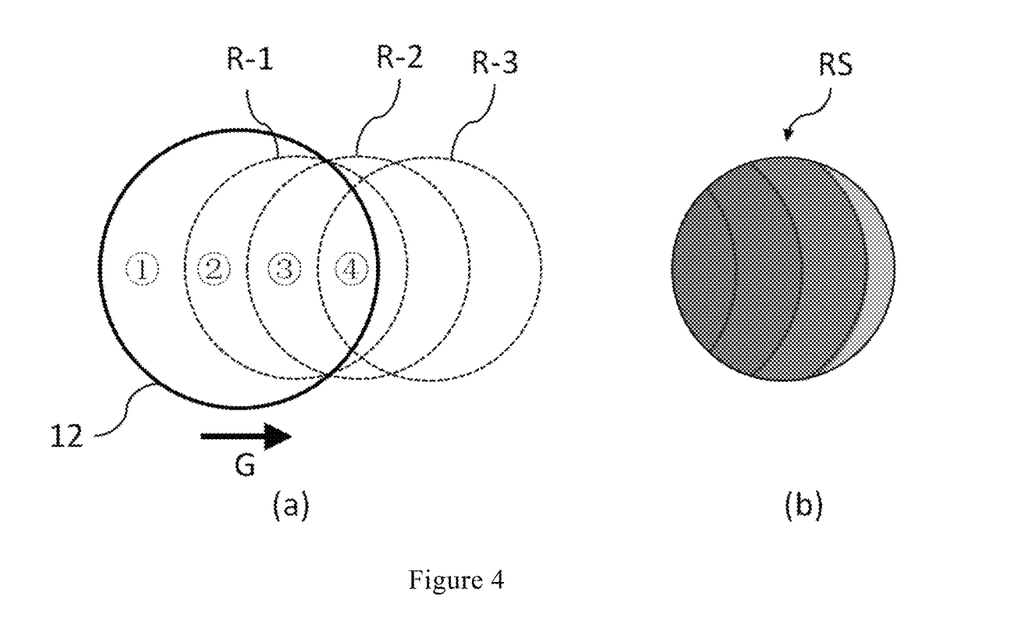
FIG. 4 schematically illustrates the positional relationship of a plurality of reflective footprints of light with respect to a first relief grating in an input section of an optical waveguide device for display, and the energy distribution state of the reflection spots.

FIG. 4 is a schematic view, of which figure (a) schematically illustrates positions of a plurality of reflection spot contours of light relative to the first relief grating 12 in the input section of the optical waveguide device 1 for display, wherein reflection spot contours R-1, R-2, and R-3 are the reflection spot contours of light coupled into the waveguide substrate 11 for the first reflection, the second reflection, and the third reflection, respectively, on the surface 11a; graph (b) schematically illustrates the energy distribution state of the reflection spots after leaving the first relief grating 12, in which lights in these different shaded areas from right to left are subjected to 0 reflections, 1 reflection, 2 reflections, and 3 reflections, respectively, in the region where the first relief grating 12 lies. With the maximum average number N of reflections per se decreases, the reduction in reflection loss caused by a unit of reduction in the number of reflections relative to the number M of reflections (e.g., 1) is incremental. Therefore, for further improving the coupling-in comprehensive efficiency of the optical waveguide device 1 for display, it is preferred to further configure the refractive index of the input section 10 such that the number N of reflections≤1.5. This will be described in more detail below in connection with data examples.

The optical waveguide device for display according to embodiments of the present disclosure is particularly suitable for being thinner and lighter, in which the thickness of the first waveguide substrate 11 can be h≤0.75 mm, preferably h≤0.65 mm, and more preferably h≤0.5 mm. In other words, in the case of adopting the first waveguide substrate 11 with the thickness described above, the optical waveguide device for display according to embodiments of the present disclosure is capable of efficiently suppressing the optical energy loss caused by the reflection of light in the region where the first relief grating 12 lies, thereby realizing a high coupling-in comprehensive efficiency and being conducive to realization of good display brightness and uniformity.

Referring back to FIG. 2, in some advantageous embodiments, the second waveguide substrate 21 of the output section 20 of the optical waveguide device 1A for display can have a third refractive index n3, and the second relief grating 22 can have a fourth refractive index n4, and the optical waveguide device 1A for display can be configured in such a way that n2<n3 and n2<n4. In such a configuration, coupling-out efficiency can be advantageously enhanced by increasing the refractive index of the second waveguide substrate 21 and the second relief grating 22.

In some advantageous embodiments, n3−n2>0.1. This is conducive to the reduction of reflection losses of light at the interface between the first waveguide substrate 11 and the second waveguide substrate 21.

In addition or alternatively, as shown in FIG. 2, an antireflection coating ARF (shown in FIG. 3) can be formed on a border between the first waveguide substrate 11 and the second waveguide substrate 21, which is conducive to increasing the transmittance of light from the first waveguide substrate 11 to the second waveguide substrate 21.

Furthermore, as shown in FIG. 3, in some advantageous embodiments, the first waveguide substrate 11 of the input section 10 can be integral with the second waveguide substrate 21 of the output section 20. In this case, the second waveguide substrate 21 also has the second refractive index n2.

It should be understood that although there is no intermediate layer between the first relief grating and the first waveguide substrate in the optical waveguide device 1A for display according to the first embodiment of the present disclosure shown in the accompanying drawings, the present disclosure is not limited in this aspect, as long as the refractive index configurations of the first relief grating and the first waveguide substrate conform to the requirements set forth in the present disclosure and are capable of realizing the corresponding technical effects.

The technical effects of the optical waveguide device for display according to embodiments of the present disclosure will be described below through data examples.

Data Example 1

In data example 1, the first relief grating has a circular shape with a diameter of 5 mm and is a transmissive slant grating with a grating period d=420 nm, a duty cycle of 50%, and a depth of 300 nm; the second relief grating is a two-dimensional grating; the refractive indices of the first relief grating and the second relief grating satisfy n1=n4=1.9; the thickness of the first waveguide substrate is h=0.75 mm; the predetermined FOV range of the FOV is that FOVX is of −12° ~12°, FOVY is of −9° ~9°; the light beam has a circular cross-section with a diameter of 4 mm; the wavelength is 530 nm; and the predetermined diffraction order is positive first order.

In data example 1, an example of an optical waveguide device for display according to embodiments of the present disclosure in which the refractive index of the first waveguide substrate n2=1.7, and a comparative example of an optical waveguide device for display in which the refractive index of the first waveguide substrate n2'=1.9, are simulated respectively, and the diffraction efficiency of positive first order, the reflection loss proportion, and coupling-in comprehensive efficiency of the first relief gratings of the two optical waveguide devices are calculated. The diffraction efficiency of positive first order, the reflection loss proportion and the coupling-in comprehensive efficiency are all based on the total optical energy incident on the first relief grating, and the coupling-in comprehensive efficiency is the value obtained by subtracting the reflection loss proportion from the diffraction efficiency of positive first order.

Figure 5:
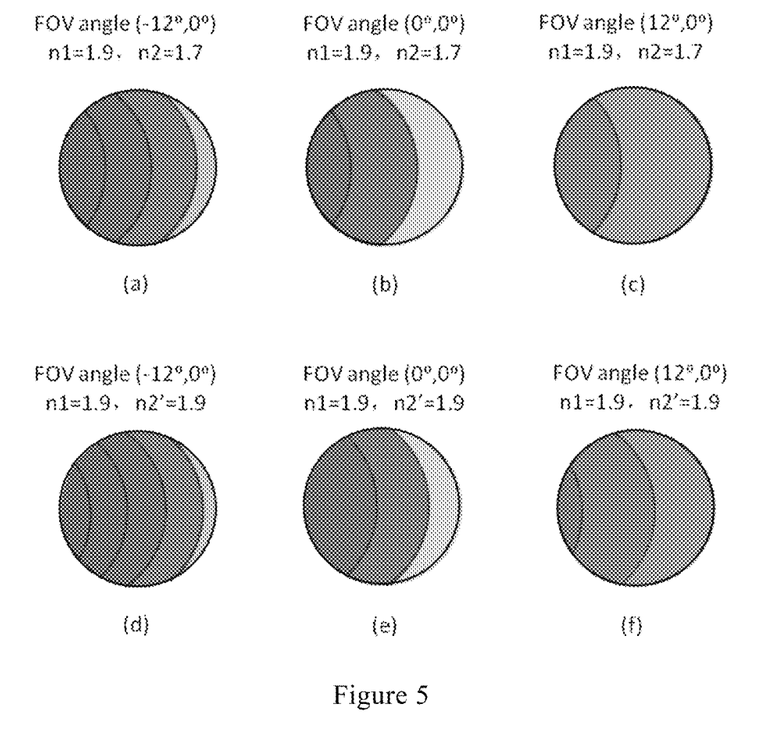
FIG. 5 schematically illustrates examples of reflection spots corresponding to different FOV obtained in Data Example 1 based on an optical waveguide device for display according to embodiments of the present disclosure and based on an optical waveguide device of a comparative example.

FIG. 5 is a schematic diagram, of which figures (a), (b), and (c) illustrate an optical energy distribution state of the reflection spots obtained based on an optical waveguide device for display according to embodiments of the present disclosure configured as above in data example 1, and figures (d), (e), and (f) illustrate energy distribution state of light of the reflection spot corresponding to different FOV obtained based on a comparative example of optical waveguide device configured as above, wherein different shaded areas from right to left indicate an increase in the number of reflections of light occurring in the region where the first relief grating 12 lies (the rightmost region is an region of 0 reflections). As can be seen intuitively in FIG. 5, the numbers of reflections of lights having different FOV angles in the optical waveguide device for display according to embodiments of the present disclosure are reduced compared to the comparative example, which is apparently conducive to the reduction of reflection losses.

Figure 6:
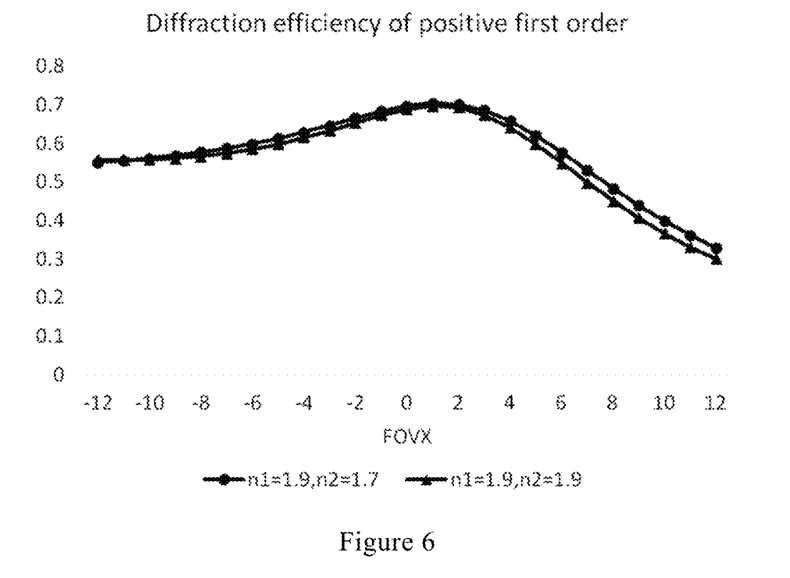
FIG. 6 is a diagram of the diffraction efficiency of positive first order of the first relief grating in Data Example 1, which changes with FOV angle/incidence angle.
Figure 7:
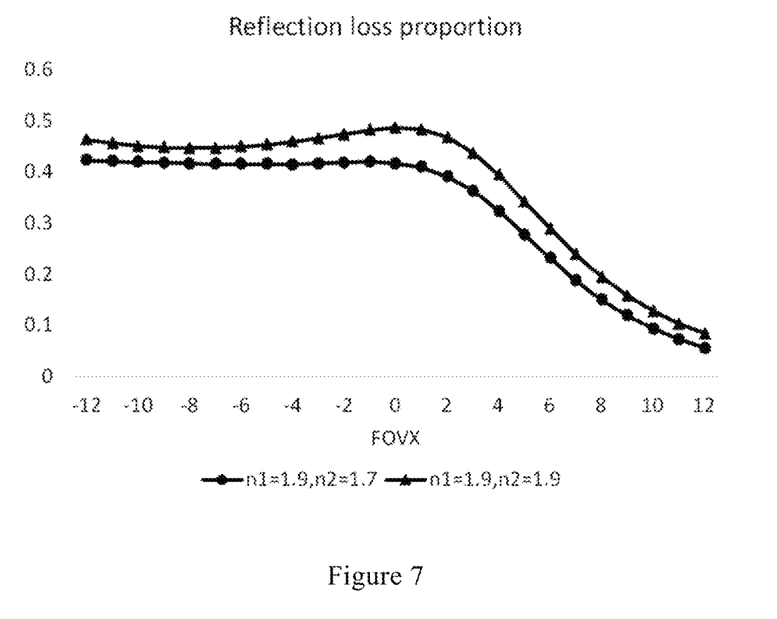
FIG. 7 is a diagram of the proportion of reflection loss of the first relief grating in Data Example 1, which changes with FOV/incident angle.
Figure 8:
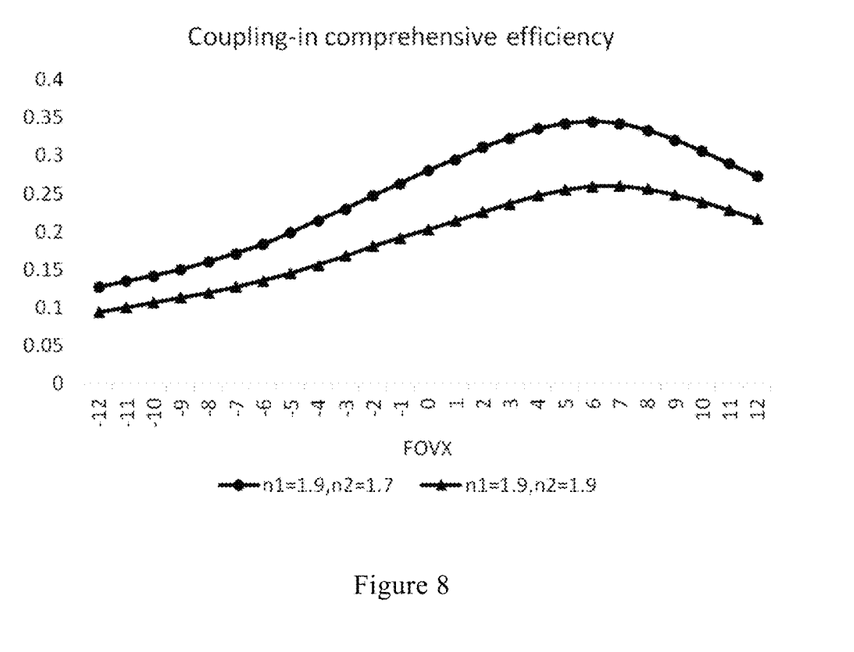
FIG. 8 is a diagram of the coupling-in comprehensive efficiency of the first relief grating in Data Example 1, which changes with FOV/incidence angle.

FIG. 6, FIG. 7 and FIG. 8 show diagrams of diffraction efficiency of positive first order, the reflection loss proportion and the coupled-into comprehensive effect changing with the FOV/incident angle, respectively, for the first relief grating in data example 1. FIG. 6 shows that a high diffraction efficiency of positive first order can be obtained in the case of n1=1.9, n2=1.7, which can even be slightly higher than that in the case of n1=1.9, n2'=1.9; FIG. 7 shows that the reflection loss proportion in the case of n1=1.9, n2=1.7 is significantly lower than that in the case of n1=1.9, n2'=1.9 case; FIG. 8 shows that the final coupled-into comprehensive effect obtained in the case of n1=1.9, n2=1.7 is significantly higher than the coupled-in integrated efficiency obtained in the case of n1=1.9, n2'=1.9.

For showing more clearly the relevant improvement effects, the average values of the diffraction efficiency of positive first order, the reflection loss proportion and the coupled-into comprehensive efficiency obtained in data example 1 are given in Table 1 below.

TABLE 1

|  | n1 = 1.9, n2 = 1.7 | n1 = 1.9, n2' = 1.9 |
| --- | --- | --- |
| Diffraction efficiency of positive first order | 58.2% | 56.7% |
| Reflection loss proportion | 33.1% | 37.9% |
| Coupled-into comprehensive efficiency | 25.1% | 18.8% |

As can be seen from Table 1, the coupled-into comprehensive efficiency of the optical waveguide device for display according to embodiments of the present disclosure has been improved by 33.5% as compared to the comparative example.

Data Example 2

In data example 2, a thinner and lighter waveguide substrate is used, and the thickness of the first waveguide substrate is h=0.5 mm; the first relief grating has a circular shape with a diameter of 4 mm, and is a transmissive slant grating with a grating period of d=410 nm, a duty cycle of 45%, and a depth of 280 nm; the second relief grating is a two-dimensional grating; the refractive indices of the first relief grating and the second relief grating satisfy n1=n4=1.9; the predetermined FOV range is that FOVX is of −12° ~12°, FOVY is of −9° ~9°; the light beam has a circular cross-section with a diameter of 3.6 mm; the wavelength is 530 nm; and the predetermined diffraction order is positive first order.

Figure 9:
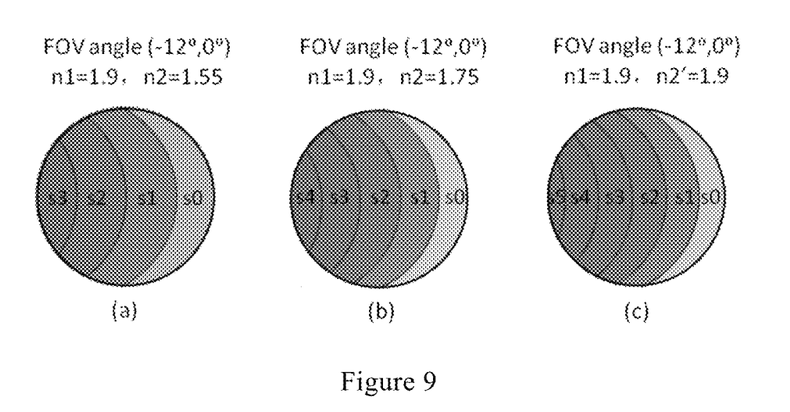
FIG. 9 schematically illustrates examples of reflection spots obtained based on different optical waveguide devices in Data Example 2.

In data example 2, an example of an optical waveguide device for display according to embodiments of the present disclosure in which the refractive index of the first waveguide substrate n2=1.55 and n2=1.75, and a comparative example of an optical waveguide device for display in which the refractive index of the first waveguide substrate n2'=1.9, are simulated respectively. FIG. 9 schematically illustrates an example of a reflection spot with a FOV of (−12°, 0°) obtained based on different optical waveguide devices in data example 2; and FIG. 10 shows a diagram of the coupling-in comprehensive efficiency of the first relief grating in data example 2 changing with the FOV/incident angle.

Figure 10:
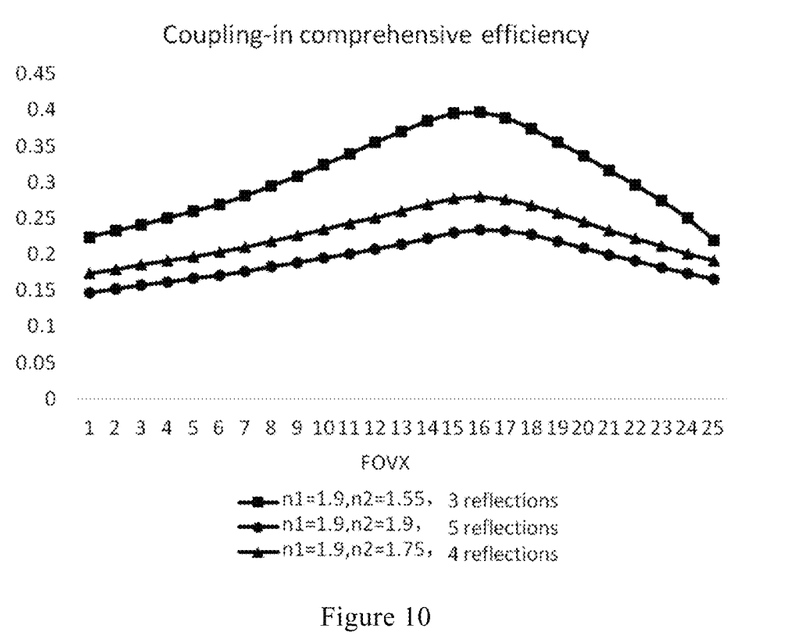
FIG. 10 is a diagram of the coupling-in comprehensive efficiency of the first relief grating in Data Example 2, which changes with FOV/incident angle.

Referring to FIG. 9 and FIG. 10 in combination, it can be seen that: in the comparative example with n1=1.9, n2'=1.9, the light having a FOV angle of (−12°, 0°) corresponding to the smallest diffraction angle of positive first order is subjected, on the surface 11a in the region where the first relief grating lies, to a maximum number of reflections, which is 5 and is relatively larger (corresponding to a maximum average number N of reflections of about 2), and its coupling-in comprehensive efficiency is only 19.2%; when n2 is reduced to 1.75, the maximum number of reflections is reduced to 4 (corresponding to a maximum average number N of reflections of about 1.5), and the coupling-in comprehensive efficiency reaches 22.8%, with an improvement of 18.8%; and when n2 is reduced to 1.55, the maximum number of reflections is reduced to 3 (corresponding to a maximum average number N of reflections of about 1), and the coupling-in comprehensive efficiency reaches 31.0%, with a further improvement of 36%; wherein, it can be further seen that the improvement of the coupling-in comprehensive efficiency brought about by the reduction of the maximum number of reflections from 4 to 3 is twice as large as the improvement of the coupling-in comprehensive efficiency brought about by the reduction of the maximum number of reflections from 5 to 4.

In the sense of the magnitude of the improvement described above, preferably the maximum average number of reflections satisfies N≤1.5; and more preferably, N≤1 in the optical waveguide device for display according to embodiments of the present disclosure.

Furthermore, data example 2 also shows that the optical waveguide device for display according to embodiments of the present disclosure is particularly suitable for a thinner and lighter application. More specifically, the thickness of the first waveguide substrate 11 in the optical waveguide device for display according to embodiments of the present disclosure can satisfy h≤0.75 mm, preferably, h≤0.65 mm, and more preferably, h≤0.5 mm.

Referring back to FIG. 9, areas of the regions in the light spot, diffracted lights of the predetermined order from which are subjected to 0 reflection, 1 reflection, 2 reflections, 3 reflections, 4 reflections, and 5 reflections on the surface 11a in the region where the first relief grating lies, are labeled with s0, s1, s2, s3, s4, and s5, respectively. Assuming that e1 is the diffraction efficiency of positive first order (predetermined order) of the first relief grating, and e0 is the reflection efficiency of zero order on the surface 11a for the positive first order diffracted light in the region where the first relief grating lies, the coupled-into comprehensive efficiency eff can be expressed as:

$$\mathit{eff} = e1s0 + e1e0s1 + e1e0^2s2 + e1e0^3s3 + e1e0^4s4 + e1e0^5s5 + \ldots + e1e0^PsP$$

wherein P is the maximum number of reflections, and sP is the area of the region in the light spot, the diffracted light of the predetermined orders from which is subjected to P times of reflections on the surface 11a in the region where the first relief grating lies, and conforms to s=s0+s1+s2+s3+ . . . +sP.

With the maximum number of reflections increases, the areas of respective regions s0, s1, s2 . . . decrease, the maximum average number N of reflections increases, and the value of the coupled-into comprehensive efficiency eff decreases. By decreasing the maximum number of reflections and decreasing the maximum average number N of reflections, the coupled-into comprehensive efficiency can be efficiently improved. Not only that, with the maximum number of reflections and the corresponding maximum average number of reflections increase, in order to realize a predetermined magnitude of improvement in the coupled-into comprehensive efficiency, the reduction of the maximum average number of reflections required increases in magnitude.

For example, when the maximum number of reflections P=5, the light spot area s=s0+s1+s2+s3+s4+s5; when the maximum number of reflections P is reduced to 4, the light spot area s=s0'+s1'+s2'+s3'+s4'; when the maximum number of reflections P is reduced to 3, the light spot area s=s0"+s1"+s2"+s3". As can be seen in comparison with FIG. 9, the region areas s0', s1', s2', s3', s4' each have a larger area compared to the initial region areas s0, s1, s2, s3, s4, and the average area of the five regions increases from s/6 to s/5, indicating an increment of about 20% in average area for each region. Meanwhile, it can also be seen from FIG. 9 that with the maximum number of reflections P decreases, the area of the region corresponding to the maximum number of reflections P always decreases, while the area of the region corresponding to 0 reflection always increases. Taken together, roughly speaking, with the maximum number of reflections being reduced from 5 to 4 (which approximately corresponds to the maximum average number N of reflections being reduced from 2 to 1.5) the coupling-in comprehensive efficiency is improved by about 20% by reducing the reflection loss. Similarly, with the maximum number of reflections being reduced from 4 to 3 (which approximately corresponds to the maximum average number N of reflections being reduced from 1.5 to 1), the average area is increased by about 25% for each region, and thus the coupling-in comprehensive efficiency is improved by about 25% by reducing the reflection losses; and with the maximum number of reflections being reduced from 3 to 2 (which approximately corresponds to the maximum average number N of reflections being reduced from 1 to 0.5), the average area is increased by about 33% for each region, and thus the coupling-in comprehensive efficiency is improved by about 33% by reducing the reflection loss.

Based on the above analysis and the data examples presented above, according to embodiments of the present disclosure, N is controlled by configuring the refractive indices of the first relief grating and the first waveguide substrate such that N≤2, and that when N≤1, N≤M−0.25; when 1<N≤1.5, N≤M−0.5; and when 1.5<N≤2, N≤M−0.75. Preferably, N is controlled such that N≤1.5.

Next, the optical waveguide device for display according to the second embodiment of the present disclosure will be described with reference to FIG. 11 to FIG. 16. The optical waveguide device 1B for display according to the second embodiment of the present disclosure can have the same structure and parameter configuration as the optical waveguide device 1A for display according to the first embodiment of the present disclosure which has already been described above, with the difference mainly lying in that: the optical waveguide device 1B for display according to the second embodiment further comprises a composite synergistic layer disposed between the first relief grating and the first waveguide substrate.

Figure 11:
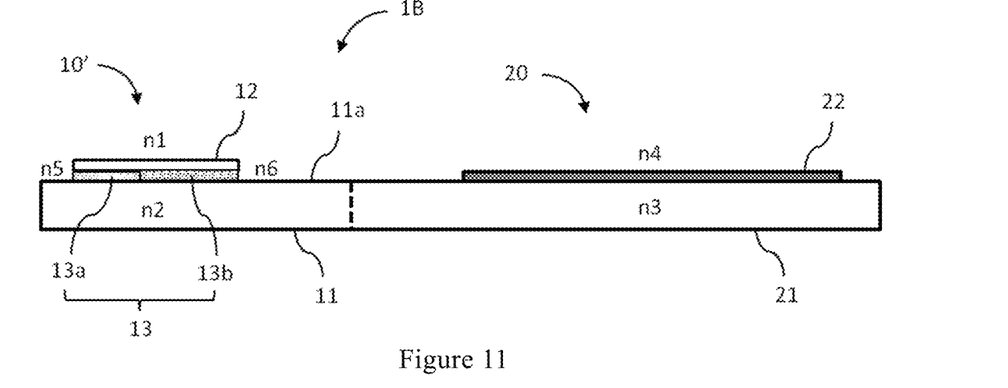
FIG. 11 is a cross-sectional schematic view of an optical waveguide device for display according to the second embodiment of the present disclosure.
Figure 12:
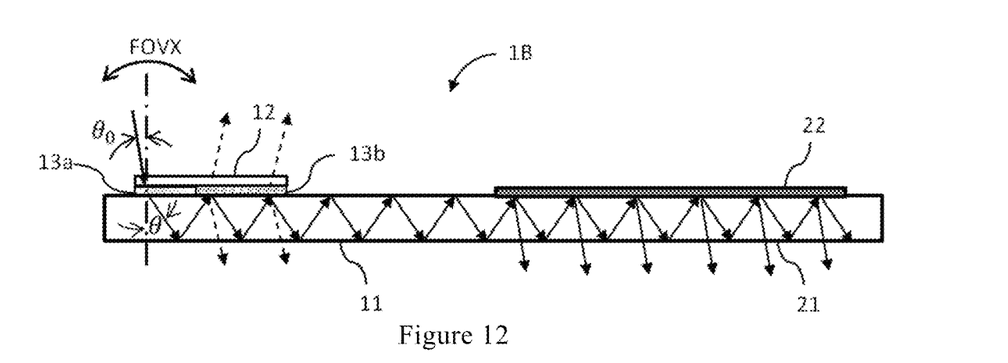
FIG. 12 schematically illustrates light propagation in an optical waveguide device for display according to the second embodiment of the present disclosure.

FIG. 11 shows a cross-sectional schematic view of an optical waveguide device 1B for display according to the second embodiment of the present disclosure; and FIG. 12 schematically illustrates light propagation in an optical waveguide device for display according to the second embodiment of the present disclosure. As shown in FIG. 11 and FIG. 12, the input section 10' of the optical waveguide device 1B comprises a first waveguide substrate 11 and a first relief grating 12 formed on a surface 11a of the first waveguide substrate 11, and the input section 10' further comprises a composite synergistic layer 13 disposed between the first relief grating 12 and the first waveguide substrate 11. According to embodiments of the present disclosure, the composite synergistic layer 13 comprises at least two subregions, the at least two subregions comprise a first subregion 13a disposed upstream and a second subregion 13b disposed downstream in the direction of the first grating vector G, and the first subregion 13a and the second subregion13b have the same thickness and have a fifth refractive index n5 and a sixth refractive index n6, respectively, such that in the first subregion13a, diffracted light of the predetermined order is subjected to constructive thin-film interference as it passes through the composite synergistic layer, and in the second subregion 13b, reflected light of zero order is subjected to constructive thin-film interference as the diffracted light of the predetermined order is reflected on the surface 11a.

According to the second embodiment of the present disclosure, a composite synergistic layer as configured above is added, which on one hand, improves the diffraction efficiency of the predetermined diffraction order of the first relief grating 12 by making use of the constructive thin-film interference of diffracted light of the predetermined order in the first subregion, thereby increasing the optical energy initially coupled into the first waveguide substrate 11, and on the other hand, suppresses the reflection loss caused by reflection of light already coupled into the first waveguide substrate 11 on the surface 11a, by making use of the constructive interference in the second subregion. It should be noted that what is done here is making the desired reflection of zero order be subjected to constructive interference, so as to weaken the energy loss of other diffraction orders except for the reflection of zero order. In this way, further optimization of the coupling-in efficiency is achieved by taking into account different propagation patterns of light in the region where the first relief grating lies.

Advantageously, the composite synergistic layer can comprise at least one transition subregion, which is disposed between the first region and second region in the direction of the first grating vector.

Advantageously, a spacing of boundaries between the at least two subregions of the composite synergistic layer in the direction of the first grating vector substantially equals to a minimum value of spacings in the direction of the first grating vector between reflection positions of two sequential reflections on the surface 11a of a waveguide substrate after light of a predetermined FOV range is coupled into the waveguide substrate.

Advantageously, a boundary between at least two of the subregions is straight, arcuate, or polyline-shaped.

FIG. 13, FIG. 14, FIG. 15 and FIG. 16 illustrate different examples of the ways in which the composite synergistic layer is divided into subregions in the optical waveguide device for display according to the second embodiment of the present disclosure. In figures (a) in FIG. 13, FIG. 14, FIG. 15 and FIG. 16, the composite synergistic layer 13 (which coincides with the scope of the region where the first relief grating 12 lies) is depicted using a solid line; the reflection spots contours for the $1^{st}$, $2^{nd}$ and $3^{rd}$ reflections, which the light having a FOV angle of (−12°, 0°) corresponding to the minimum diffraction angle for the positive one order is subjected to on the surface 11a in the region where the first relief grating lies, are depicted using dashed lines; and the region where the composite synergistic layer 13 lies is divided into respective areas according to the boundaries of the reflection spot contours, which are labeled as ①, ②, ③, and ④ in the figures. The composite synergistic layer 13 and its subregions are shown separately in figures (b) in the above respective drawings.

Figure 13:
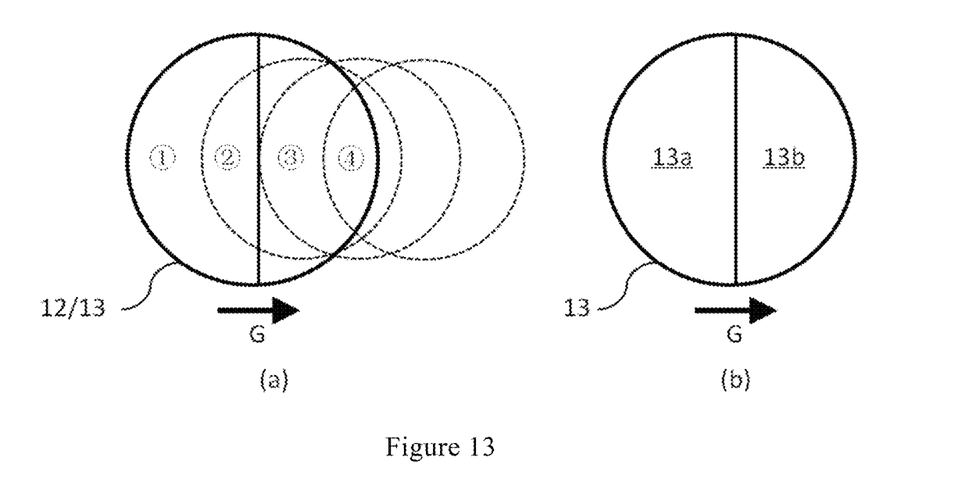
FIG. 13, FIG. 14, FIG. 15, and FIG. 16 show different examples of the ways in which the composite synergistic layer is divided into subregions in an optical waveguide device for display according to the second embodiment of the present disclosure.

In the example shown in FIG. 13, the composite synergistic layer 13 is divided into a first subregion 13a and a second subregion 13b with a straight line in a direction perpendicular to the first grating vector G based on the boundary of the reflection spot contour of the $2^{nd}$ reflection. That is, a large part of areas ①, ② in figure (a) of FIG. 13 are delineated into the first subregion 13a, and areas ③, ④ and a small part of areas ①, ② are delineated into the second subregion 13b.

Figure 14:
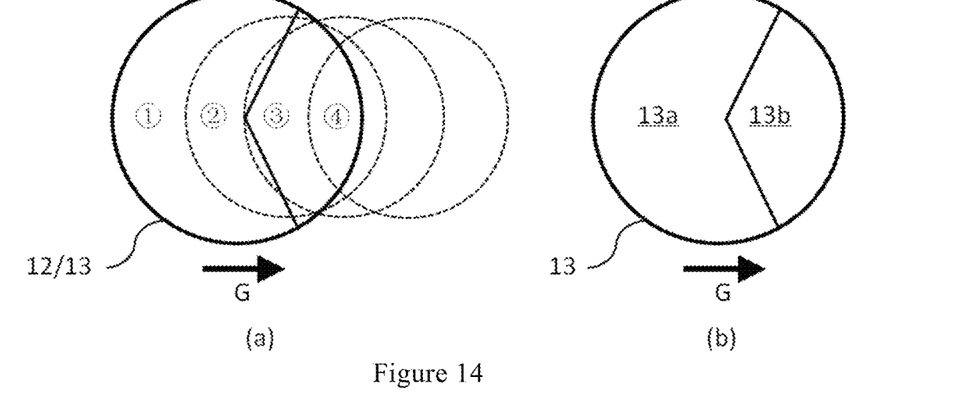

The example shown in FIG. 14 is a variant of the example shown in FIG. 13, in which the straight border line in the composite synergistic layer 13 shown in FIG. 13 is substituted with a combination of polylines, so as to allow for a larger area, in which the $1^{st}$ and the $2^{nd}$ reflections occur, to be delineated into the first subregion 13a.

Figure 15:
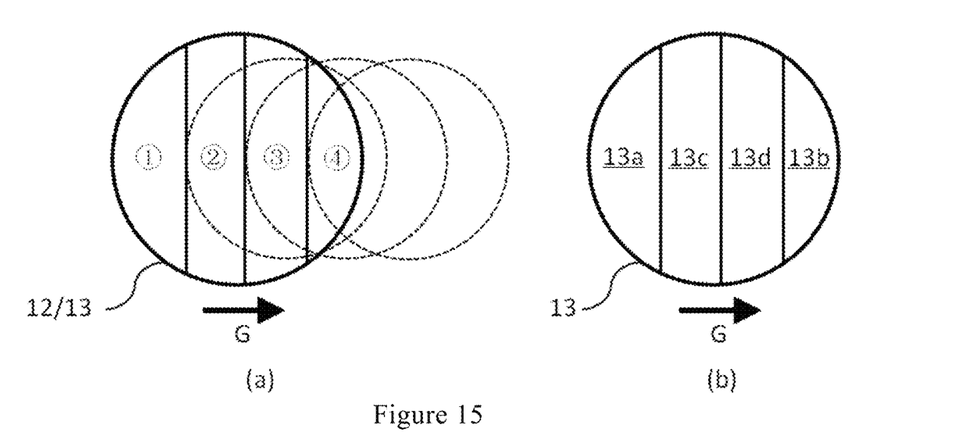

In the example shown in FIG. 15, the composite synergistic layer 13 is divided with straight lines in a direction perpendicular to the first grating vector G according to boundaries of the reflection spot contours of the $1^{st}$, $2^{nd}$ and $3^{rd}$ reflections, to obtain the first subregion 13a disposed most upstream and the second subregion 13b disposed most downstream, as well as the transition subregion 13c and the transition subregion 13d deposed between them. Thus, the spacing of the boundaries between adjacent subregions of the composite synergistic layer in the direction of the first grating vector substantially equals to a spacing in the direction of the first grating vector between reflection positions of two sequential reflections on the surface 11a of the first waveguide substrate after light having a certain incident angle is coupled into the waveguide substrate. Advantageously, the transition subregion 13c and transition subregion 13d have the same thickness as and refractive indexes different from those of the first subregion 13a and the second subregion 13b, in order to balance in the respective subregions the need to increase the diffraction efficiency of the predetermined diffraction order of the first relief grating 11 and the need to reduce the reflection loss.

It should be understood that the number of transition subregions here is only exemplary but not limiting; and more or fewer transition subregions can be provided as required in different applications. In addition, position and shape of a transition subregion can differ from that shown in FIG. 15.

Figure 16:
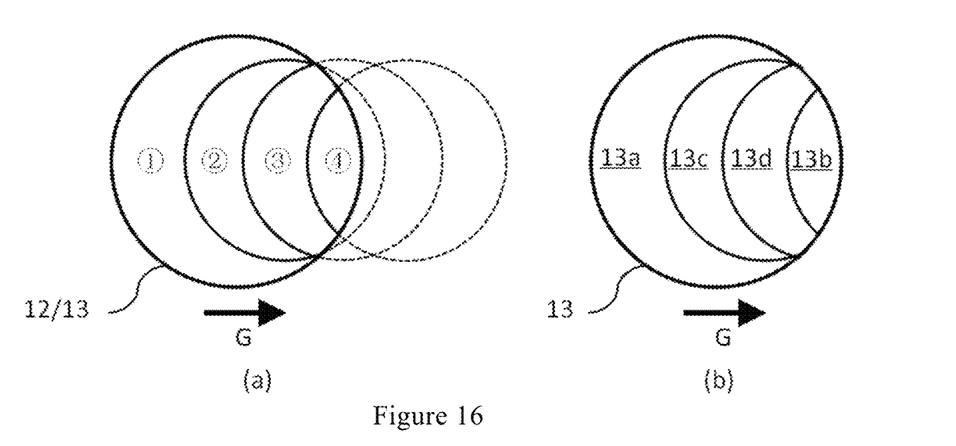

In the example shown in FIG. 16, the composite synergistic layer 13 is divided with arcuate lines according to the boundaries of the reflection spot contours of the 1st, 2nd, and 3rd reflections, such that areas ①, ④ in figure (a) are delineated into the first subregion 13a and the second subregion 13b, respectively, and areas ②, ③ are delineated into the transition subregion 13c and the transition subregion 13d, respectively. Advantageously, the transition subregion 13c and the transition subregion 13d have the same thickness as and refractive indexes different from those of the first subregion 13a and the second subregion 13b.

The technical effects of the optical waveguide device for display according to the second embodiment of the present disclosure will be introduced below with data examples.

Data Example 3

In data example 3, the first relief grating has a circular shape with a diameter of 5 mm and is a transmissive slant grating with a grating period d=420 nm, a duty cycle of 50%, and a depth of 300 nm; the second relief grating is a two-dimensional grating; the refractive indices of the first relief grating and the second relief grating satisfy n1=n4=1.9; the thickness of the first waveguide substrate is h=0.75 mm; the refractive index of the first waveguide substrate is n2=1.7; the predetermined FOV range of the FOV is that FOVX is of −12°~12°, FOVY is of −9° ~9°; and the predetermined diffraction order is positive first order.

Four structures are simulated in data example 3:

(1) no intermediate layer between the first relief grating and the first waveguide substrate;

(2) there is a composite synergistic layer between the first relief grating and the first waveguide substrate, the thickness of the composite synergistic layer is t=160 nm, the composite synergistic layer has a first subregion and a second subregion divided as shown in FIG. 13, and the refractive index of the first subregion is n5=1.65 and the refractive index of the second subregion is n6=2.6;

(3) there is a uniform intermediate layer between the first relief grating and the first waveguide substrate, the thickness of the intermediate layer are t'=t=160 nm, and the refractive index of the intermediate layer are n=n5=1.65; and (4) there is a uniform intermediate layer between the first relief grating and the first waveguide substrate, the thickness of the intermediate layer are t'=t=160 nm, and the refractive index of the intermediate layer are n'=n6=2.6.

The coupled-into comprehensive efficiencies obtained from the simulation calculations with the above four structures are shown in Table 2 below:

TABLE 2

| | Structure (1) | Structure (2) | Structure (3) | Structure (4) |
|---|---|---|---|---|
| Layer thickness | No | t = 160 nm | t' = 160 nm | t' = 160 nm |
| Refractive index | No | n5 = 1.65, n6 = 2.6 | n = 1.65 | n' = 2.6 |
| Coupled-in comprehensive efficiency | 25.1% | 27.5% | 25.3% | 25.3% |

As can be seen from Table 2, the structure (2) with the addition of the composite synergistic layer according to the second embodiment of the present disclosure can improve the coupling-in comprehensive efficiency by 10% as compared to the structure (1) without an intermediate layer; while the coupling-in comprehensive efficiencies obtained based on the structure (3) and the structure (4) are only slightly improved as compared to the structure (1) without an intermediate layer. This shows that the composite synergistic layer added to the optical waveguide device according to the second embodiment of the present disclosure is not a simple combination of the intermediate layers provided in structure (3) and structure (4), and that the composite synergistic layer provides additional and prominent technical effect by division and combination of different subregions.

The optical waveguide device according to embodiments of the present disclosure can be applied to a display device. Such a display device can be, for example, a near-eye display device comprising a lens and a frame for holding the lens close to the eye, in which the lens comprises the optical waveguide device for display according to embodiments of the present disclosure as described above. Preferably, the display device can be an augmented reality display device or a virtual reality display device.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. An optical waveguide device for display, comprising an input section and an output section, in which the input section comprises a first waveguide substrate and a first relief grating formed on a surface of the first waveguide substrate, and the first relief grating has a first grating vector and is used to couple light irradiated on the first relief grating at an incident angle within a predetermined FOV range, into the first waveguide substrate through diffraction of a predetermined order, in such a way that the light propagates in the first waveguide substrate through total reflection in substantially the direction of the first grating vector, so as to be coupled out of the waveguide device for display by the output section, wherein:

the first relief grating has a first refractive index n1, the first waveguide substrate has a second refractive index n2, and n2<n1, such that a first maximum average number of reflections that a light beam of any incident angle within the predetermined FOV range is subjected to on the surface of the first waveguide substrate after the diffraction of the predetermined order before leaving a region where the first relief grating lies, is N, and N≤2, wherein: when N≤1, N≤M−0.25; when 1<N≤1.5, N≤M−0.5; and when 1.5<N≤2, N≤M−0.75, wherein M is a second maximum average number of reflections that the light beam is subjected to on the surface of the first waveguide substrate after the diffraction of the predetermined order before leaving the region where the first relief grating lies, where the refractive index of the first waveguide substrate is equal to the first refractive index n1.

2. The optical waveguide device for display of claim 1, wherein the first and the second maximum average number N of reflections and M are calculated with the following formulae, respectively:

$$N = \max\left(\cfrac{L}{4h\tan\left(\arcsin\left(\cfrac{\sin(\theta_0) + \cfrac{k\lambda}{d}}{n_2}\right)\right)} - 0.5\right)$$

$$M = \max\left(\cfrac{L}{4h\tan\left(\arcsin\left(\cfrac{\sin(\theta_0) + \cfrac{k\lambda}{d}}{n_1}\right)\right)} - 0.5\right)$$

wherein L is a length of the first relief grating in the direction of the first grating vector, h is a thickness of the first waveguide substrate, $\theta_0$ is an incident angle of light relative to the first relief grating, k is the predetermined order, $\lambda$ is a wavelength of light, and d is a grating period corresponding to the first grating vector.

3. The optical waveguide device for display of claim 1, wherein the maximum average number N of reflections≤1.5.

4. The optical waveguide device for display of claim 1, wherein the predetermined order is positive first order.

5. The optical waveguide device for display of claim 1, wherein the thickness of the first waveguide substrate h≤0.75 mm.

6. The optical waveguide device for display of claim 5, wherein the thickness of the first waveguide substrate h≤0.65 mm.

7. The optical waveguide device for display of claim 6, wherein the thickness of the first waveguide substrate h≤0.5 mm.

8. The optical waveguide device for display of claim 1, further comprising a turning section provided with a turning grating for relaying light from the input section to the output section through diffraction.

9. The optical waveguide device for display of claim 1, wherein the input section further comprises a composite synergistic layer disposed between the first relief grating and the first waveguide substrate, the composite synergistic layer comprises at least two subregions, the at least two subregions comprise a first subregion disposed upstream and a second subregion disposed downstream in the direction of the first grating vector, and the first subregion and the second subregion have the same thickness and have a fifth refractive index n5 and a sixth refractive index n6, respectively, such that diffracted light of the predetermined order is subjected to constructive thin-film interference in the first subregion as it passes through the composite synergistic layer, and reflected light of zero order is subjected to constructive thin-film interference in the second subregion as the diffracted light of the predetermined order is reflected on said surface of the first waveguide substrate.

10. The optical waveguide device for display of claim 9, wherein the composite synergistic layer further comprises at least one transition subregion, which has the same thickness as and a refractive index different from those of the first subregion and second subregion.

11. The optical waveguide device for display of claim 10, wherein at least one transition subregion lies between the first subregion and subsecond region in the direction of the first grating vector.

12. The optical waveguide device for display of claim 9, wherein a spacing of boundaries between the at least two subregions of the composite synergistic layer in the direction of the first grating vector substantially equals to a spacing in the direction of the first grating vector between reflection positions of two sequential reflections on the surface of the first waveguide substrate after light of a certain incident angle is coupled into the first waveguide substrate.

13. The optical waveguide device for display of claim 9, wherein at least a boundary between two of the subregions is straight, arcuate, or polyline-shaped.

14. The optical waveguide device for display of claim 1, wherein the output section comprises a second waveguide substrate and a second relief grating formed on the second waveguide substrate, the second waveguide substrate has a third refractive index n3, and the second relief grating has a fourth refractive index n4, wherein n2<n3, and n2<n4.

15. The optical waveguide device for display of claim 14, wherein n3-n2>0.1.

16. The optical waveguide device for display of claim 14, wherein an antireflection coating is formed on a border between the first waveguide substrate and the second waveguide substrate for enhancing transmittance of light from the first waveguide substrate to the second waveguide substrate.

17. The optical waveguide device for display of claim 1, wherein the output section comprises a second waveguide substrate and a second relief grating formed on the second waveguide substrate, and the first waveguide substrate is integral with the second waveguide substrate, such that the second waveguide substrate has the second refractive index n2.

18. A display device comprising an optical waveguide device for display of claim 1.

19. The display device of claim 18, wherein the display device is a near-eye display device and comprises a lens and a frame for holding the lens close to the eye, the lens comprising the optical waveguide device for display.

20. The display device of claim 18, wherein the display device is an augmented reality display device or a virtual reality display device.

* * * * *